(12) United States Patent
Vogel (10) Patent No.: US 12,306,452 B2
(45) Date of Patent: May 20, 2025

(54) SYSTEMS AND METHODS OF MANAGING CABLES IN TELECOMMUNICATION SYSTEMS

(71) Applicant: AFL Telecommunications LLC, Duncan, SC (US)

(72) Inventor: Mark Vogel, Greenville, SC (US)

(73) Assignee: AFL Telecommunications LLC, Duncan, SC (US)

( * ) Notice: Subject to any disclaimer, the term of this patent is extended or adjusted under 35 U.S.C. 154(b) by 0 days.

(21) Appl. No.: 18/543,281

(22) Filed: Dec. 18, 2023

(65) Prior Publication Data

US 2024/0118511 A1 Apr. 11, 2024

Related U.S. Application Data

(63) Continuation of application No. 17/680,414, filed on Feb. 25, 2022, now Pat. No. 11,886,029.

(60) Provisional application No. 63/159,250, filed on Mar. 10, 2021.

(51) Int. Cl.
*G02B 6/44* (2006.01)
*G02B 6/50* (2006.01)

(52) U.S. Cl.
CPC ......... *G02B 6/4457* (2013.01); *G02B 6/4458* (2013.01); *G02B 6/501* (2023.05)

(58) Field of Classification Search
CPC ..... G02B 6/4457; G02B 6/4458; G02B 6/501
See application file for complete search history.

(56) References Cited

U.S. PATENT DOCUMENTS

| | | |
|---|---|---|
| 6,127,626 A | 10/2000 | Haag et al. |
| 6,554,489 B2 | 4/2003 | Kent et al. |
| 6,567,602 B2 | 5/2003 | Cole et al. |
| 6,585,195 B2 | 7/2003 | Wentworth et al. |
| 6,817,780 B2 | 11/2004 | Ngo |
| 6,959,139 B2 | 10/2005 | Erwin et al. |
| 7,006,739 B2 | 2/2006 | Elkins et al. |
| 7,155,093 B2 | 12/2006 | Elkins et al. |
| 7,349,610 B2 | 3/2008 | Ohsono et al. |
| 7,391,950 B2 | 6/2008 | Lewallen et al. |
| 7,463,803 B2 | 12/2008 | Cody et al. |
| 7,480,436 B2 | 1/2009 | Wells et al. |
| 7,515,806 B2 | 4/2009 | Zellak et al. |
| 7,542,651 B2 | 6/2009 | Lewallen |
| 7,590,321 B2 | 9/2009 | Lu et al. |
| 7,630,606 B2 | 12/2009 | Lu et al. |
| 7,676,132 B1 | 3/2010 | Mandry et al. |
| 7,903,926 B2 | 3/2011 | Cody et al. |
| 8,187,043 B2 | 5/2012 | Kumakura et al. |

(Continued)

FOREIGN PATENT DOCUMENTS

| | | |
|---|---|---|
| CA | 2878730 C | 6/2020 |
| DE | 10219532 A1 | 11/2003 |

(Continued)

*Primary Examiner* — Ryan A Lepisto
(74) *Attorney, Agent, or Firm* — Dority & Manning, P.A.

(57) ABSTRACT

Cable managers are provided. A cable manager includes a body configured to be selectively engaged with a loose end of a first cable, wherein the body defines an effective unbiased length, as measured in an unbiased state, and an effective biased length, as measured in a biased state, and wherein the effective biased length is greater than the effective unbiased length.

19 Claims, 4 Drawing Sheets

(56) References Cited

U.S. PATENT DOCUMENTS

| | | |
|---|---|---|
| 8,238,705 B2 | 8/2012 | Lewallen et al. |
| D682,222 S | 5/2013 | Crucitti |
| 8,472,772 B2 * | 6/2013 | Griffiths ............... G02B 6/4442 385/135 |
| 8,814,446 B2 | 8/2014 | Labraymi et al. |
| 8,834,213 B2 | 9/2014 | Sato et al. |
| 9,071,045 B2 | 6/2015 | Furukawa |
| 9,246,284 B2 | 1/2016 | Wu et al. |
| 9,726,843 B2 | 8/2017 | Logan et al. |
| 9,755,326 B2 | 9/2017 | Kitagawa et al. |
| 9,831,567 B2 | 11/2017 | Miyakawa et al. |
| 9,909,636 B2 | 3/2018 | Kompa et al. |
| 9,985,424 B2 | 5/2018 | Wolf et al. |
| 10,079,448 B2 | 9/2018 | Lv et al. |
| 10,162,144 B2 | 12/2018 | Nielsen et al. |
| 10,180,554 B2 | 1/2019 | Marcou et al. |
| 10,379,307 B2 | 8/2019 | Sasaki et al. |
| 10,718,921 B2 | 7/2020 | Torres |
| 10,862,289 B2 | 12/2020 | Diop et al. |
| 11,575,228 B2 * | 2/2023 | Willey ................. F16M 13/022 |
| 2002/0190451 A1 | 12/2002 | Sancaktar et al. |
| 2008/0145008 A1 | 6/2008 | Lewallen et al. |
| 2009/0003778 A1 * | 1/2009 | Elkins, II ............. G02B 6/4475 385/95 |
| 2017/0287597 A1 | 10/2017 | Wagner et al. |
| 2019/0113094 A1 | 4/2019 | Watanabe et al. |
| 2020/0373685 A1 | 11/2020 | Onuma |
| 2021/0003803 A1 | 1/2021 | Park et al. |

FOREIGN PATENT DOCUMENTS

| | | |
|---|---|---|
| DE | 19944060 B4 | 4/2008 |
| DE | 102010031307 A1 | 1/2012 |
| EP | 0027393 B1 | 11/1983 |
| EP | 0829122 B1 | 8/1999 |
| EP | 0997756 A2 | 5/2001 |
| EP | 1431786 A2 | 6/2004 |
| EP | 1320915 B1 | 7/2009 |
| EP | 2330448 B1 | 3/2014 |
| EP | 3014140 B1 | 6/2017 |
| EP | 3451037 A1 | 3/2019 |
| EP | 3726267 A1 | 8/2022 |
| FR | 2513801 A1 | 4/1983 |
| GB | 2585668 A | 2/2023 |
| JP | 2008216787 A | 9/2008 |
| JP | 2008249824 A | 10/2008 |

* cited by examiner

SYSTEMS AND METHODS OF MANAGING CABLES IN TELECOMMUNICATION SYSTEMS

CROSS-REFERENCE TO RELATED APPLICATIONS

The present application is a continuation of U.S. patent application Ser. No. 17/680,414, filed Feb. 25, 2022, which claims priority to U.S. Provisional Patent Application 63/159,250 filed on Mar. 10, 2021, the disclosures of which are incorporated by reference herein in their entirety.

FIELD

The present disclosure relates generally to systems and methods of managing cables in telecommunication systems, and more particularly to cable managers for managing fiber optic cables.

BACKGROUND

Telecommunication systems typically utilize long runs of cable which span great distances. These spans often include spliced intersections and interfaces where two or more cables are joined together. These intersections and interfaces are typically stored in contained environments, such as enclosed volumes (e.g., hand-holes), to prevent unwanted access and environmental contamination. These enclosed volumes are typically tightly constrained in size.

When working on the cables, operators typically pull loose ends of the cables from the tightly constrained storage volumes and bring the loose ends to a separate location to be operated on. After completing the operation, the cables are wrapped to a size that fits in the tightly constrained storage volume. However, this operation is difficult to perform as the cables typically have stiff outer jackets and fragile inner fibers. Thus, the operator must be careful not to damage the cables while applying sufficient force to overcome their stiffness so as to compress the cables to fit within the tightly constrained storage volume.

Typical wrapping operations require two or more operators that walk the cable back to the storage volume while simultaneously wrapping the cable. If, after walking the cable back to the storage volume, the wrapped coils are too large to fit in the storage volume, the operators must squeeze the loops of the wrapped cables to fit within the storage volume (which may incur damage to the optical fibers) or unwind the cables and start the wrapping operation again. This creates repeat opportunities to damage the cables. If the cables become damaged, the operators may be required to repair the cables, replace portions of the cables, or even replace the entire cables.

Accordingly, improved systems and methods of managing cables in telecommunication systems are desired in the art. In particular, systems and methods which allow for efficient storage and access of the cables would be advantageous.

BRIEF DESCRIPTION

Aspects and advantages of the invention in accordance with the present disclosure will be set forth in part in the following description, or may be obvious from the description, or may be learned through practice of the technology.

In accordance with one embodiment, a cable manager for one or more cables of a telecommunication system is provided. The cable manager includes a body configured to be selectively engaged with a loose end of at least one of the one or more cables, wherein the body defines an effective unbiased length, as measured in an unbiased state, and an effective biased length, as measured in a biased state, and wherein the effective biased length is greater than the effective unbiased length.

In accordance with another embodiment, a telecommunication system is provided. The telecommunication system includes a storage volume; a first cable extending from the storage volume; a second cable extending from the storage volume; and a cable manager comprising a body configured to be selectively engaged with at least one of the first or second cables and form an extension spring for the at least one of the first or second cables.

In accordance with another embodiment, a method of storing one or more cables in a storage volume of a telecommunication system is provided. The one or more cables are configured to extend from the storage volume to a separate cable operation station spaced apart from the storage volume. The method includes coupling the one or more cables to a cable manager; and moving the cable manager between an extended position where the cable manager is in a biased state and a retracted position where the cable manager is in an unbiased state.

These and other features, aspects and advantages of the present invention will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present invention, including the best mode of making and using the present systems and methods, directed to one of ordinary skill in the art, is set forth in the specification, which makes reference to the appended figures, in which.

DETAILED DESCRIPTION

Reference now will be made in detail to embodiments of the present invention, one or more examples of which are illustrated in the drawings. The word "exemplary" is used herein to mean "serving as an example, instance, or illustration." Any implementation described herein as "exemplary" is not necessarily to be construed as preferred or advantageous over other implementations. Moreover, each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive- or and not to an exclusive- or. For example, a condition A or B is satisfied by any one of the following: A is true (or present) and B is false (or not present), A is false or not present) and B is true (or present), and both A and B are true (or present).

Terms of approximation, such as "about," "generally," "approximately," or "substantially," include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Benefits, other advantages, and solutions to problems are described below with regard to specific embodiments. However, the benefits, advantages, solutions to problems, and any feature(s) that may cause any benefit, advantage, or solution to occur or become more pronounced are not to be construed as a critical, required, or essential feature of any or all the claims.

In general, embodiments described herein are directed to cable management systems and associated methods which protect cables of telecommunication systems from damage (e.g., kinking and exceeding minimum bend diameters) while offering easier storage and access to the cables. The cable management system can include a cable manager. In accordance with one or more embodiments, the cable manager is a cable spring configured to receive the cables. The cable spring can be movable between a retracted position and an extended position. In the retracted position, the cable spring can fit within a storage volume (e.g., a hand-hole). In the extended position, the cable spring can extend from the storage volume to a separate cable operation station, allowing the cables to be operated on at a location spaced apart from the storage volume. After finishing work on the cables at the cable operation station, the cable spring can be moved to the retracted position and fit within the storage volume. To facilitate easier redimensioning of the cable spring to permit storage in the storage volume, the cable spring can define a generally helical shape which can be elongated along a centerline. The generally helical shape can include a plurality of coils that can be configured to cant relative to the centerline when acted upon, e.g., when pulled by the operator. In such a manner, the cable spring can be readily reconfigurable and attached to the cables to facilitate easier storage and access to the cables.

Figure 1:
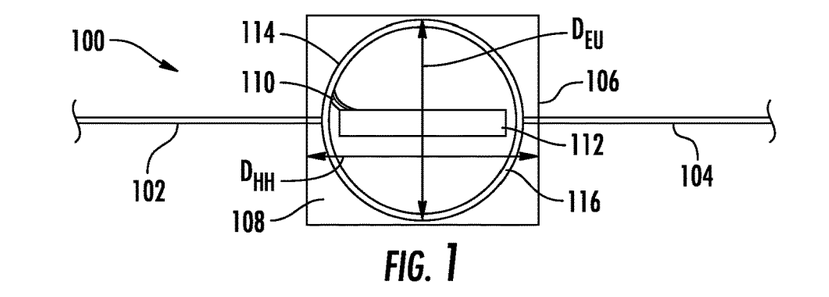
FIG. 1 is a schematic view of a telecommunication system in accordance with embodiments of the present disclosure.

Referring now to the drawings, FIG. 1 illustrates a schematic view of a portion of a telecommunication system 100 in accordance with an exemplary embodiment of the present disclosure. The telecommunication system 100 can generally include one or more cables, including for example, a first cable 102 and a second cable 104. In an embodiment, at least one of the first or second cables 102 or 104 can include a fiber optic cable. The fiber optic cable can include one or more optical fibers disposed within an outer jacket. The fiber optic cable may further include one or more strength members, one or more wicking members, one or more secondary wires, one or more electrode wires, or any combination thereof.

In accordance with one or more embodiments described herein, the first and second cables 102 and 104 may be spliced together at an on-site location. For instance, the first and second cables 102 and 104 may be spliced together at a location corresponding with an access point of the telecommunication system 100. The access point can include, for example, a storage volume disposed along a length of the telecommunication system 100. In an embodiment, the access point can be a hand-hole 106 that is accessible by an operator. The hand-hole 106 can define an internal volume 108 that can be selectively accessed by the operator. The internal volume 108 may be selectively sealable from environmental conditions by a cover (not illustrated) which can be removed to reveal the internal volume 108.

The first and second cables 102 and 104 may enter the internal volume 108, for example, through openings disposed in opposite side walls of the hand-hole 106. In certain instances, the openings can be sealed after the first and second cables 102 and 104 are inserted in the openings or installed within the hand-hole 106 to prevent environmental contamination.

After being inserted into the hand-hole 106, the first and second cables 102 and 104 can each define a loose end 110. The loose ends 110 can extend from the hand-hole 106 such that the operator can move the loose ends 110 to an operation site to perform an operation on the loose ends 110. The loose ends 110 can each define lengths, as measured e.g., by a distance the loose ends 110 extend from the hand-hole 106. The lengths of the loose ends 110 should be sufficient to permit the loose ends 110 to reach a separate cable operation station (described in greater detail below) spaced apart from the hand-hole 106. That is, the lengths of the loose ends 110 should be sufficiently long to allow an operator to work on the loose ends 110.

For example, during initial installation, the loose ends 110 may be spliced together by an operator so as to complete a fiber optic connection therebetween. Typically, splicing occurs at roadside locations where a vehicle can be moved proximate to the hand-hole 106. The vehicle, e.g., a van or work truck, often includes a cable operation station with equipment to splice the cables together. In this regard, splicing can be performed by driving the vehicle to the hand-hole 106, or an area adjacent thereto, moving the loose ends 110 of the cables 102 and 104 from the hand-hole 106 to the vehicle, and performing a splicing operation on the loose ends 110 at the vehicle. During the splicing operation, the loose ends 110 of the cables 102 and 104 can be optically coupled together.

Splicing is typically performed such that one or more spliced interfaces between the first and second cables 102 and 104 are disposed within an enclosure 112. The enclosure 112 can include a body configured to receive and support the spliced interfaces. The enclosure 112 can define one or more splice trays, connectors, cable ties, bend radii limiters, splitters, or the like, which allow the operator to utilize, contain, and protect the spliced interfaces.

After completing the splicing operation, the operator can return the loose ends 110 of the cables 102 and 104 (now spliced together) to the hand-hole 106. Traditionally, this is performed by two operators, each managing a different end of the loose ends 110. A first operator stands near the hand-hole 106 while a second operator walks the loose ends 110 back to the hand-hole 106 wrapping the loose ends 110 (often using a reverse looping method). The operators must take care not to exceed minimum bend radii of the cables 102 and 104 when wrapping the loose ends 110. Moreover, the operators must wrap the loose ends 110 into a shape which fits within the internal volume 108 of the hand-hole 106. If the wrapped loose ends 110 are too large to fit within the internal volume 108, the operators must unwrap the cables 102 and 104 and repeat the wrapping operator. Alternatively, the operators may utilize one or more straps to compress the wrapped loose ends 110 to fit within the internal volume 108.

During the process of returning the loose ends 110 of the cables 102 and 104 to the hand-hole 106, the loose ends 110 of the cables 102 and 104 are repeatedly being twisted and deformed. Even one instance of exceeding the minimum bend radius of either of the cables 102 or 104 can result in costly repair or replacement operations. Accordingly, the process of returning the loose ends 110 to the hand-hole 106 is significantly improved by using a cable spring 114 in accordance with one or more embodiments described herein.

The cable spring 114 can generally include a body 116. The body 116 of the cable spring 114 can be configured to be coupled with at least one of the first or second cables 102 or 104. In an embodiment, the body 116 can be configured to be coupled with both of the first and second cables 102 and 104.

Figure 2:
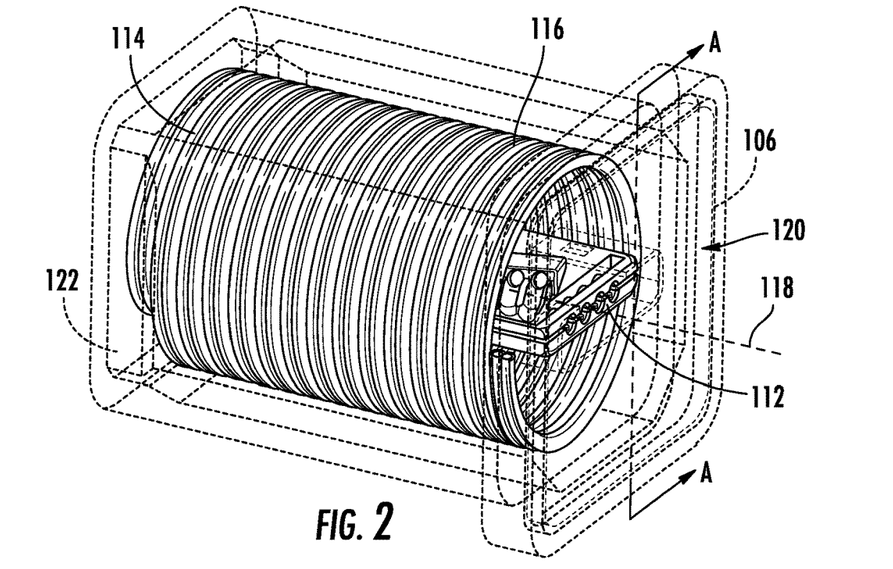
FIG. 2 is a perspective view of a portion of a telecommunication system in accordance with embodiments of the present disclosure with a storage volume of the telecommunication system illustrated in dashed lines and a cable manager of the telecommunication system illustrated in solid lines.
Figure 3:
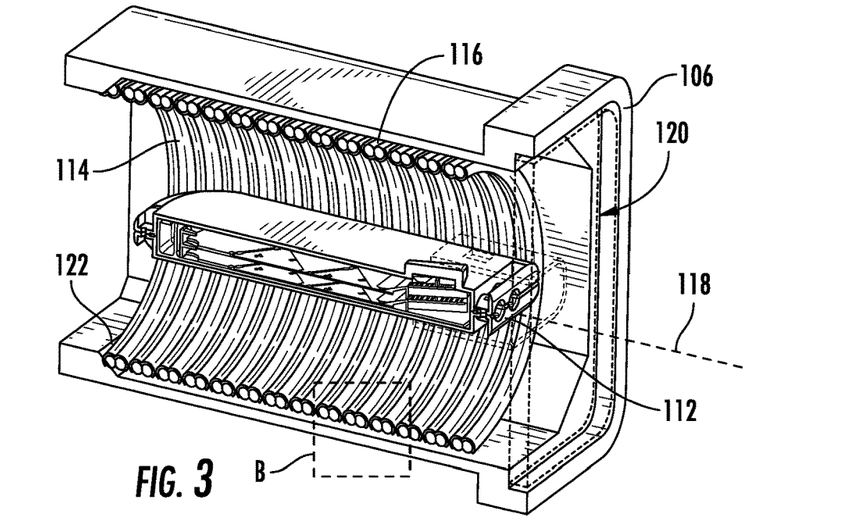
FIG. 3 is a cross-sectional view of the telecommunication system of FIG. 2 as seen along Line A-A in accordance with embodiments of the present disclosure.

Referring to FIGS. 2 and 3, the body 116 of the cable spring 114 can define a generally helical shape formed about a centerline 118. The generally helical shape can include a plurality of coils extending around the centerline 118 in a stacked axial arrangement. In an embodiment, the generally helical shape can include at least two coils, such as at least three coils, such as at least four coils, such as at least five coils, such as at least ten coils, such as at least twenty coils.

In an embodiment, the cable spring 114 can act as an extension spring. That is, the cable spring 114 can absorb and store energy as the coils are stretched apart in a direction along the centerline 118 and release energy as the coils are brought together. To absorb and store energy, the cable spring 114 can have memory such that the cable spring 114 elastically deforms to an extended position when biased and returns to its retracted position, or a partly retracted position, when released. The cable spring 114 depicted in FIG. 2 is in the retracted position as seen when the cable spring 114 is unbiased.

In the retracted position, the cable spring 114 can fit within the hand-hole 106. That is, referring again to FIG. 1, the cable spring 114 can define an effective unbiased diameter, $D_{EU}$, as measured in the unbiased state, that is less than or equal to an effective dimension, $D_{HH}$, of the hand-hole 106. In the illustrated embodiment, the effective dimension, $D_{HH}$, of the hand-hole 106 is a minimum width of the hand-hole 106. In this regard, the cable spring 114 can fit within the hand-hole 106 such that the centerline 118 of the body 116 is parallel with, or generally parallel with, a depth of the hand-hole 106, the depth of the hand-hole 106 extending from an open end 120 of the hand-hole 106 to a base 122 (FIG. 2) of the hand-hole 106.

In certain instances, the cable spring 114 can define a diameter that is less than the effective unbiased diameter, $D_{EU}$, at times when the cable spring 114 is being inserted into or removed from the hand-hole 106. That is, for example, the cable spring 114 may be compressed (e.g., the diameter of the cable spring 114 can be reduced) to fit within the effective dimension, $D_{HH}$, of the hand-hole 106. In certain instances, compressing the cable spring 114 can be performed by tightening the helical diameter of the cable spring 114 by rotating (turning) coils of the cable spring 114. This can facilitate easier size manipulation (e.g., tuning) of the diameter of the cable spring 114 (and cables) at the hand-hole 106 to allow for adjustment at the hand-hole 106 after winding is already completed. Traditional methods of inserting cables into storage volumes like hand-hole 106 do not readily allow an operator to compress the cables at the storage volume. Upon being properly, or generally, positioned in the hand-hole 106, the operator may release the cable spring 114 from the lesser diameter, causing the cable spring 114 may expand such that $D_{EU}$ is equal, or generally equal, with $D_{HH}$.

Referring again to FIGS. 2 and 3, at least one of the first or second cables 102 or 104 can be coupled to the cable spring 114. In the illustrated embodiment, the first and second cables 102 and 104 are both coupled to the cable spring 114. The first and second cables 102 and 104 may extend in a generally helical shape as supported by the generally helical shape of the body 116 of the cable spring 114. The first and second cables 102 and 104 may form a generally same path shape as one another around the centerline 118.

Figure 4:
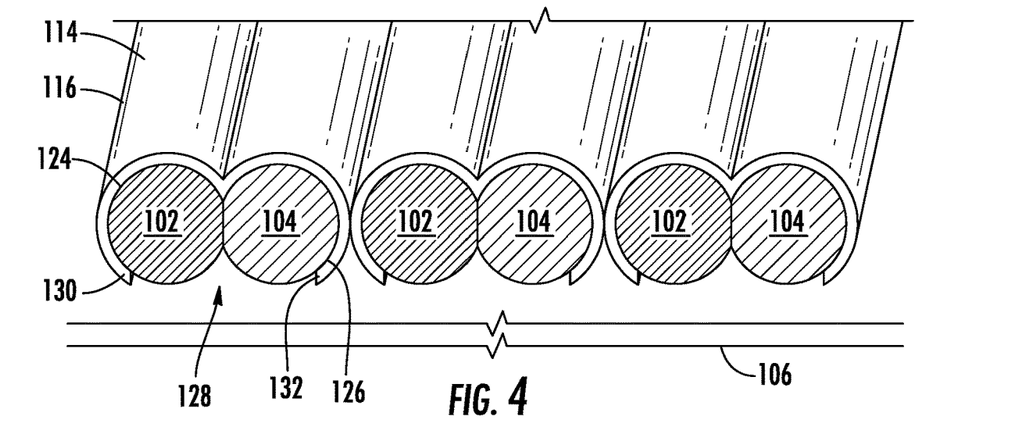
FIG. 4 is an enlarged view of a cable receiving area of the cable manager as seen in Box B of FIG. 3 in accordance with embodiments of the present disclosure.

FIG. 4 illustrates an enlarged side view of the body 116 as seen in Box B in FIG. 3. In particular, three coils of the generally helical shaped body 116 are shown as they would appear in the retracted (unbiased) position.

As illustrated, the body 116 of the cable spring 114 defines a plurality of receiving areas, including for example, a first receiving area 124 and a second receiving area 126. It should be understood that in one or more non-illustrated embodiments, the plurality of receiving areas can include at least three receiving areas, such as at least four receiving areas, such as at least five receiving areas. Each receiving area can be configured to receive one or more of the cables. In a particular embodiment, each receiving area is configured to receive one of the one or more cables. In the depicted embodiment, the first and second receiving areas 124 and 126 are in open communication with one another. In a non-illustrated embodiment, the first and second receiving areas 124 and 126 can be spaced apart from one another or otherwise separated from each other.

The first and second receiving areas 124 and 126 can each be configured to receive one or more cables. By way of example, the first receiving area 124 can be configured to receive the first cable 102 and the second receiving area 126 can be configured to receive the second cable 104. In an embodiment, at least one of the first or second cables 102 or 104 can be completely embedded, or at least partially embedded, in the cable spring 114 such that at least a portion of the at least one of the first or second cables 102 or 104 is not visible. One or more windows (not shown) in the cable spring 114 can expose at least a portion of the at least one of the first or second cables 102 or 104 from the cable spring 114. In another embodiment, at least one of the first or second cables 102 or 104 can be at least partially exposed from the cable spring 114. For instance, the body 116 can define an opening 128 through which the cables can be inserted which remains open even after insertion of the first cable 102, the second cable 104, or both the first and second cables 102 and 104. The first and second cables 102 and 104 can contact one another at an interface between the first and second receiving areas 124 and 126.

In an embodiment, the first and second receiving areas 124 and 126 can be configured to form interference fits with the first and second cables 102 and 104, respectively. Portions 130 and 132, e.g., sidewalls, of the opening 128 can deform during installation of the first and second cables 102 and 104 to initially permit passage (e.g., generally transverse passage) of the first and second cables 102 and 104 into the first and second receiving areas 124 and 126 and subsequently deform back towards an unbiased position to form the interference fit and prevent accidental detachment of the first and second cables 102 and 104.

In another embodiment, at least one of the first or second cables 102 or 104 can be secured to the first or second receiving area 124 or 126 by a strap (not illustrated), zip-tie, threaded or non-threaded fastener, a hinged cover of the cable spring 114, through adhesive or hook-and-loop engagement, or the like. The cables may be selectively removable from the cable spring 114, for example, by bending the portions 130 and 132, removing the strap or zip-tie, unthreading the threaded fastener, hinging a cover of the opening 128, removing the adhesive, or the like. In certain instances, the attachment protocol between the cables and the cable spring can be configured such that the cables do not slide or twist when disposed within the receiving areas. That is, the attachment protocol can fixedly secure the cables to the cable spring. In other instances, the attachment protocol can dynamically secure the cable to the cable spring such that the cables may move relative to the cable spring.

The first and second receiving areas 124 and 126 are illustrated extending from a radially outer side of the cable spring 114. In other embodiments, at least one of the first or second receiving areas 124 or 126 can be disposed along a different side of the cable spring 114 or along more than one side of the cable spring 114. In yet other embodiments, at least one of the first or second receiving areas 124 or 126 can have a portion extending through an internal passageway (not illustrated) extending through the body 116. While embodiments of the cable spring 114 described herein include both the first and second receiving areas 124 and 126 to receive both of the first and second cables 102 and 104, in other embodiments, the cables 102 and 104 can be disposed on different cable springs. That is, in certain instances, the hand-hole 106 can receive a plurality of cable springs. Each cable spring can support a single cable. The plurality of cable springs can be attached together or be configured to move separate from each other. While the depicted embodiment of the cable spring 114 has only two receiving areas, in other embodiments, the cable spring 114 can include three or more receiving areas, such as four or more receiving areas, such as five or more receiving areas, such as six or more receiving areas. The number of receiving areas can be determined in view of the application.

The first and second receiving areas 124 and 126 are illustrated having circular cross-sectional profiles. In accordance with another embodiment, at least one of the first and second receiving areas 124 or 126 can have a non-circular cross-sectional profile. For instance, the receiving area 124 or 126 can have a cross-sectional profile with a plurality of linear segments, a plurality of arcuate segments, a combination of linear and arcuate segments, a non-circular oval shape, or any combination thereof. In some embodiments, the first and second receiving areas 124 and 126 can have the same relative shapes as compared to one another, same relative sizes as compared to one another, or both. In other embodiments, the first and second receiving areas 124 and 126 can have different relative shapes as compared to one another, different relative sizes as compared to one another, or both.

Figure 5:
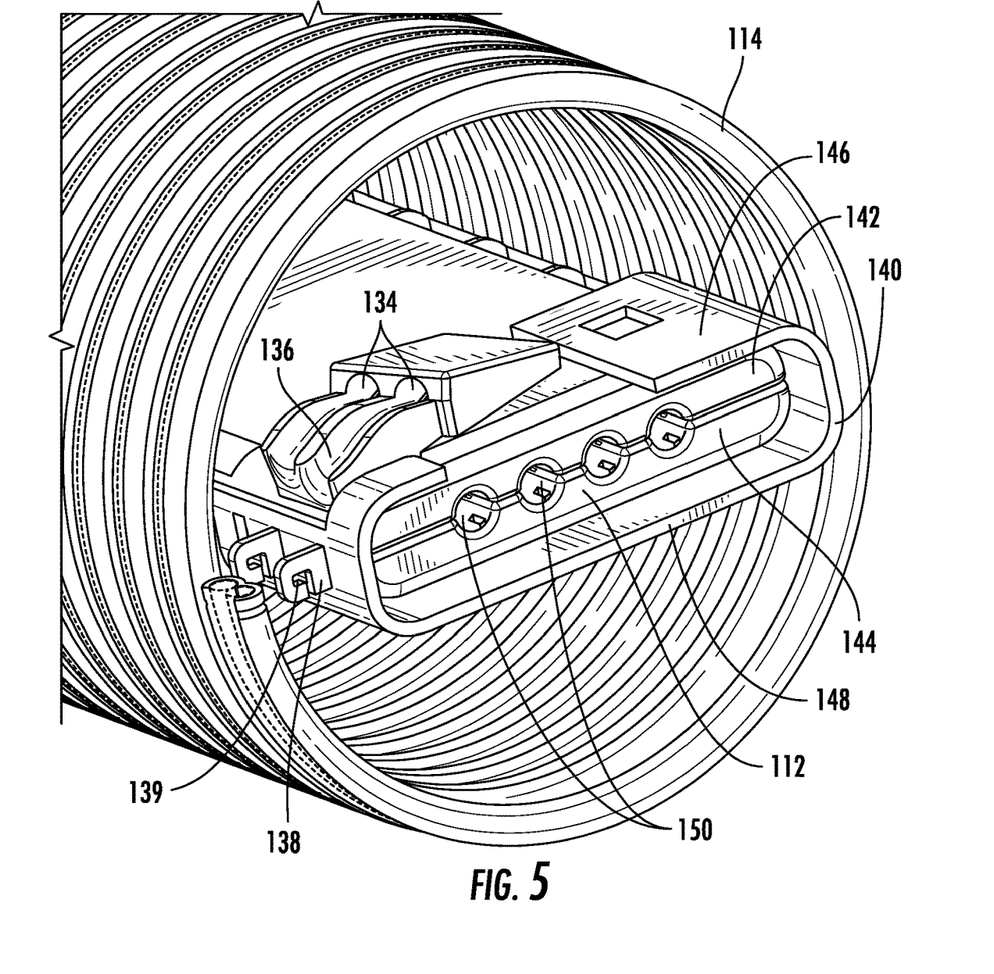
FIG. 5 is a perspective view of an end of the cable manager including an enclosure for one or more optical splices between cables of the telecommunication system in accordance with embodiments of the present disclosure.

FIG. 5 illustrates a view of the loose ends 110 of the first and second cables 102 and 104 as they exit the cable spring 114 and enter the enclosure 112. Spliced interfaces between the first and second cables 102 and 104 can be contained and protected within the enclosure 112.

The enclosure can include one or more openings 134 to allow for passage of at least one of the first or second cables 102 or 104 into the enclosure 112. In an embodiment, a guide interface 136 can guide the at least one of the first or second cables 102 or 104 into the enclosure 112. In the illustrated embodiment, the guide interface 136 includes a ramped surface. The guide interface 136 may have one or more curves with a radius of curvature above a minimum threshold bend radius of the first or second cable 102 or 104. In this regard, the guide interface 136 can support transition of the cable 102 or 104 into the enclosure 112 while mitigating damage thereto.

An attachment element 138 may be configured to attach the cable spring 114 to the enclosure 112. In an embodiment, the attachment element 138 may include features which permit the operator to attach the cable spring 114 to the enclosure 112 using, for example, a zip tie, a cord, a threaded or non-threaded fastener, hook and loop engagement structure, other similar attachment protocol, or any combination thereof. In the illustrated embodiment, the attachment element 138 comprises an interface 139 into which a zip tie or cord may be inserted and wrapped around the cable spring 114, the first cable 102, the second cable 104, or any combination thereof. Use of the attachment element 138 can prevent undesirable bending (e.g., kinking) of the first or second cable 102 or 104 at the one or more openings 134.

In the illustrated embodiment, the attachment element 138 is part of an intermediary member 140 which receives the enclosure 112. In an embodiment, the intermediary member 140 can secure the enclosure 112 in a closed position. For instance, the enclosure 112 can include a first half 142 and a second half 144. The intermediary member 140 can define a first part 146 and a second part 148, between which the first and second halves 142 and 144 of the enclosure 112 may be selectively positioned. The first and second parts 146 and 148 can define a gap in which the enclosure 112 can be held closed, e.g., compressed.

In an embodiment, the enclosure 112 can include one or more secondary openings 150. The one or more secondary openings can be configured to pass one or more secondary cables (not shown) into the enclosure 112. The one or more secondary cables can then be spliced into at least one of the first or second cables 102 or 104.

Figure 6:
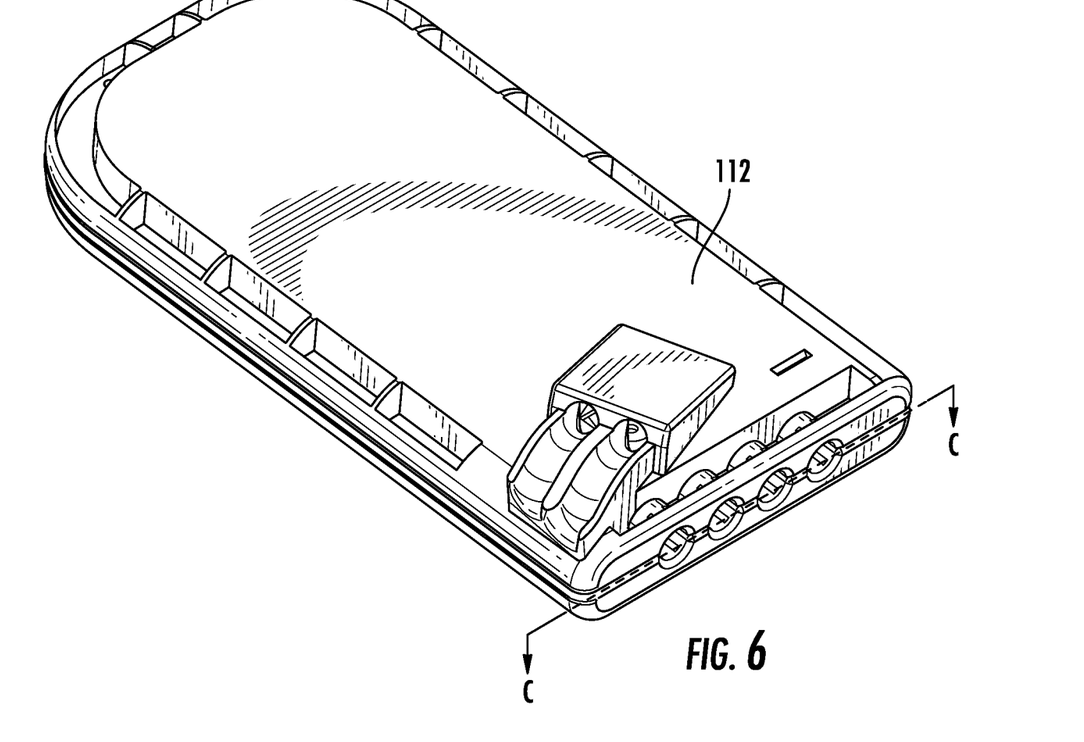
FIG. 6 is a perspective view of the enclosure of the telecommunication system in accordance with embodiments of the present disclosure.
Figure 7:
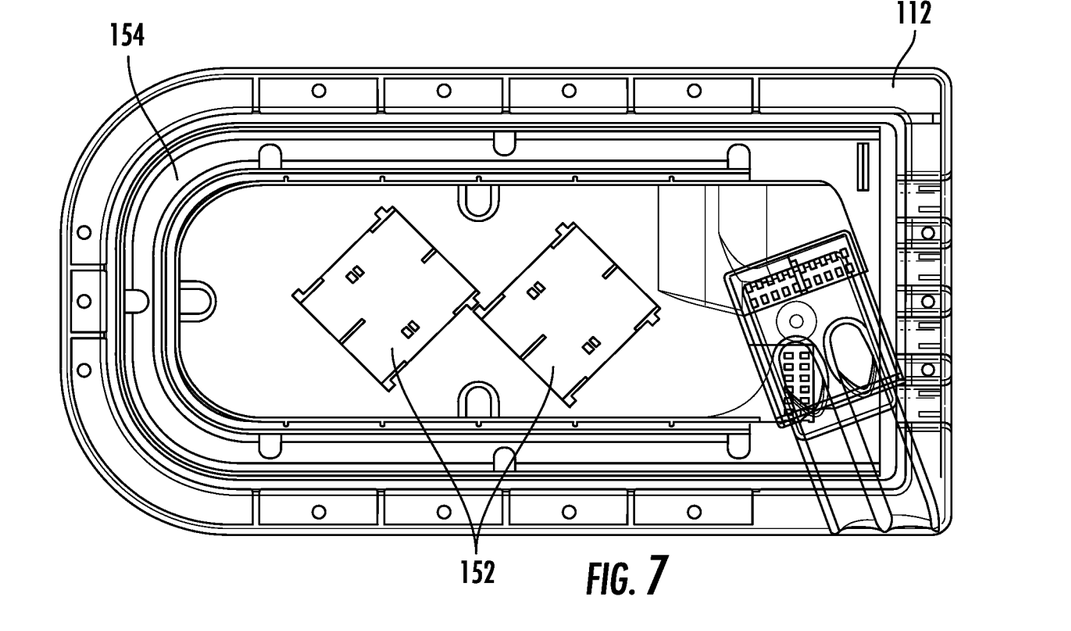
FIG. 7 is a cross-sectional top view of the enclosure as seen along Line C-C in FIG. 6 in accordance with embodiments of the present disclosure.

FIG. 6 illustrates a top perspective view of the enclosure 112 in accordance with an embodiment. FIG. 7 illustrates a partial cross-sectional view of the enclosure 112 as seen along Line C-C in FIG. 6. As depicted in FIG. 7, the enclosure 112 can define one or more equipment receiving areas 152 configured to receive, for example, one or more splice trays having a plurality of cable splice slots, one or more cassettes defining internal volumes in which splices can be housed, other telecommunication devices, such as splitters and the like, or any combination thereof. The enclosure 112 can define one or more internal passageways 154 where the first or second cable 102 or 104, or portions thereof, can be routed. The one or more internal passageways 154 may not exceed a minimum threshold bend radius of the optical fibers.

Figure 8:
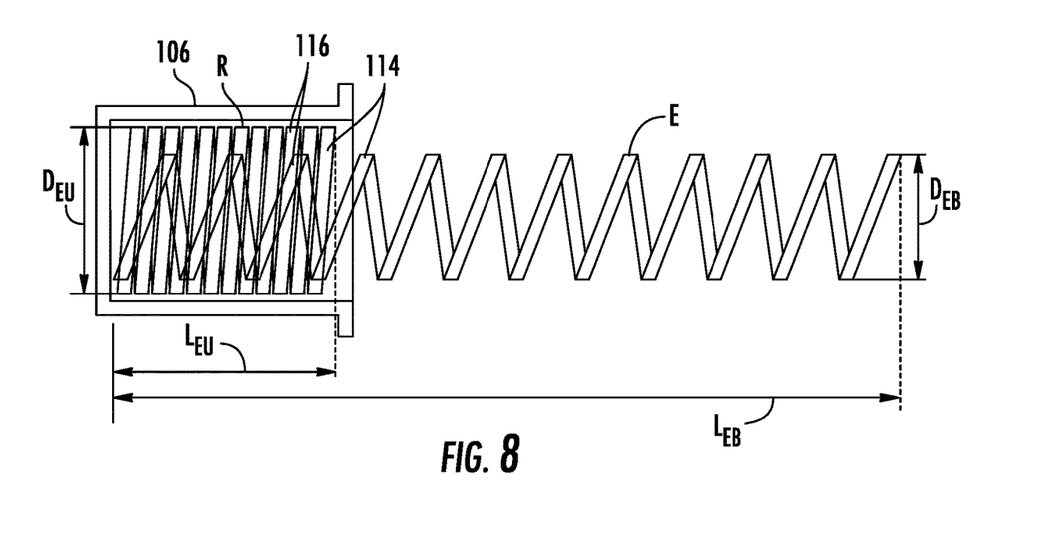
FIG. 8 is a schematic side view of the cable manager in an extended position as seen when the cable manager is in a biased state in accordance with embodiments of the present disclosure.

FIG. 8 illustrates a schematic side view of the cable spring 114 disposed within the hand-hole 106 with the body 116 in a retracted position R and extending from the hand-hole 106 in an extended position E. As illustrated, the body 116 of the cable spring 114 can define an effective unbiased length, $L_{EU}$, as measured in the unbiased state when the cable spring 114 is in the retracted position R, and an effective biased length, $L_{EB}$, as measured in the biased state when the cable spring 114 is in the extended position E. The effective biased length, $L_{EB}$, can be greater than the effective unbiased length, $L_{EU}$. For instance, in an embodiment, $L_{EB}$ is at least 150% $L_{EU}$, such as at least 200% $L_{EU}$, such as at least 300% $L_{EU}$, such as at least 400% $L_{EU}$, such as at least 500% $L_{EU}$, such as at least 750% $L_{EU}$, such as at least 1000% $L_{EU}$, such as at least 1500% $L_{EU}$, such as at least. As the effective length of the cable spring 114 increases, an effective diameter of the cable spring 114 can decrease. For instance, the body 116 of the cable spring 114 can define an effective unbiased diameter, $D_{EU}$, as measured in the unbiased state when the cable spring 114 is in the retracted position R, and an effective biased diameter, $D_{EB}$, as measured in the biased state when the cable spring 114 is in the extended position E. In an embodiment, $D_{EU}$ is at least 105% $D_{EB}$, such as at least 110% $D_{EB}$, such as at least 120% $D_{EB}$, such as at least 130% $D_{EB}$, such as at least 140% $D_{EB}$, such as at least 150% $D_{EB}$, such as at least 160% $D_{EB}$, such as at least 170% $D_{EB}$, such as at least 180% $D_{EB}$, such as at least 190% $D_{EB}$, such as at least 200% $D_{EB}$.

Energy can be stored in the body 116 as the cable spring 114 is moved from the retracted position R to the extended position E, or from a relatively retracted position to a relatively extended position. Conversely, energy is released as the cable spring 114 moves from the extended position E to the retracted position R, or from a relative extended position to a relatively retracted position. In certain instances, the cable spring 114 may automatically reconfigure from a relatively extended position to a relatively retracted position when the body 116 is actively storing energy in the form of elastic deformation and released from the relatively extended position. While the cable spring 114 may automatically reconfigure to the relatively retracted position when released, the operator may need to assist the cable spring 114 in returning to the fully retracted position. That is, the stored energy in the body 116 may not be sufficient to retract the cable spring 114 to the retracted position R without assistance. In certain instances, the stored energy may be sufficient to fully retract the cable spring 114 into the retracted position R.

The amount of relative retraction of the cable spring 114 upon release from the extended position E may depend on one or more characteristics of the cable spring 114. For instance, by way of non-limiting example, the relative capacity of the cable spring 114 to store energy may be affected by the material type of the cable spring 114, the dimension or shape of the cable spring 114, the number of coils of the cable spring 114, relative placement of the first and second receiving areas 124 and 126 along the cable spring 114, the particular attributes of the cables being used with the cable spring 114, or any combination thereof.

In certain instances, the cable spring 114 can be formed using a molding process, e.g., extrusion molding, whereby a plurality of different shaped cable springs 114 can be formed. A die may define a desired shape through which a molten, or semi-molten, material can be extruded to create the cable spring 114. The die may be selectable based on the shape or number of cables to be supported. For instance, by way of non-limiting example, the first die can define one receiving area, a second die can define two receiving areas, a third die can define three receiving areas, and the like. The dies can be sized differently in view of the relative size of the cables to be supported. Moreover, the spatial arrangement of the receiving areas may vary based on particular design considerations. The generally helical shape of the cable spring 114 can be formed during the extrusion process, for example, by twisting the die or an outfeed component (e.g., a mandrel) in communication with the extruded material. In certain instances, the extrusion process can include a coextrusion process whereby multiple extrusions are performed (e.g., simultaneously or successively) to create the body 116.

By way of example, the cable spring 114 may include a plastic, a metal, an alloy, or combinations thereof. The plastic may be filled or reinforced to alter a material characteristic of the body 116. By way of non-limiting example, for a plastic body 116, the body 116 can include acrylonitrile butadiene styrene (ABS), polycarbonate, polycarbonate blends, nylon, polyethylene, polyamides, polycarbonate (PC). By way of non-limiting example, the filler(s) can include glass fibers, carbon fibers, silicon, graphite, PEEK, molybdenum disulfide, aromatic polyester, carbon particles, bronze, fluoropolymer, thermoplastic fillers, silicon carbide, aluminum oxide, polyamidimide (PAI), PPS, polyphenylene sulfone (PPSO2), liquid crystal polymers (LCP), aromatic polyesters, and mineral particles such as wollastonite and barium sulfate, or any combination thereof. In an embodiment, the body 116 of the cable spring 114 can have a flexural modulus higher than the flexural modulus of all of the one or more cables to be received therein such that the cable spring 114 can retract with the one or more cables using stored energy within the cable spring 114.

Use of the cable spring 114 can reduce internal stress in the first and second cables 102 and 104 when the cable spring 114 is in at least the retracted position R as compared to when the first and second cables 102 and 104 are redimensioned to fit within the hand-hole 106 without using the cable spring 114. That is, while traditional methods of wrapping the cables after a splicing operation often results in the creation of internal stresses within the cables, methods of using the cable spring 114 described in greater detail below can result in minimal internal stress in the cables while simultaneously facilitating an easier and more efficient process of storing the cables in the hand-hole 106.

Figure 9:
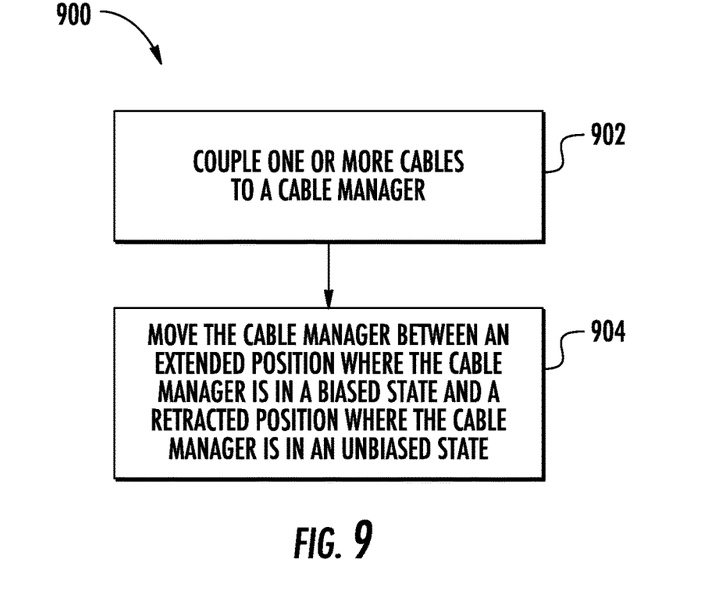
FIG. 9 is a method of storing one or more cables in a storage volume of the telecommunication system in accordance with embodiments of the present disclosure.

FIG. 9 illustrates a flow chart of an exemplary method 900 of storing one or more cables in a storage volume of a telecommunication system. The one or more cables are configured to extend from the storage volume to a separate cable operation station spaced apart from the storage volume. As previously described, the separate cable operation station can be part of a vehicle or an independent operation station. The cable operation station can include equipment associated with cable splicing operations.

The method 900 includes a step 902 of coupling the one or more cables to a cable spring and a step 904 of moving the cable spring between an extended position where the cable manager is in a biased state and a retracted position where the cable manager is in an unbiased state.

The cable spring can include any one or more of the attributes as described herein with respect to the cable spring 114. For instance, the cable spring can define a generally helical body with a first receiving area configured to receive a first cable of the one or more cables and a second receiving area configured to receive a second cable of the one or more cables. The first and second receiving areas can be disposed along a radially outer side of the cable spring.

The step 902 of coupling the one or more cables to the cable spring can include selectively coupling each of the first cable and the second cable to the cable spring. During step 902, the cable spring can be in a retracted, or substantially retracted, position. In certain instances, step 902 can be performed by transversely moving the first or second cable into the first or second receiving area. More particularly, the step 902 can be performed by transversely moving the first or second cable in a direction toward a centerline of the generally helical shape of the body. In certain instances, the first and second cables can be coupled to the cable spring sequentially, i.e., successively. In other instances, the first and second cables can be coupled to the cable spring at a same, or generally same time. That is, for instance, the operator may install the first cable along one or two coils of the cable spring and then install the second cable along the same one or two coils of the cable spring. The operator can then continue installing the first and second cables along one or more additional coils in an alternating or simultaneous manner.

In an embodiment, the operator can prepare the cables prior to coupling the cables to the cable spring at step 902. Preparing the cables may include elongating the cables such that the loose ends of the cables are not twisted or knotted. In certain instances, this can be performed by walking the loose ends of the cables away from the storage volume and laying the cables on the ground. After positioning the cable spring at a location at, or adjacent to, the storage volume, the step 902 of coupling the cables to the cable spring may be performed. During step 902, having the loose ends of the cables free can allow for natural release of twisting in the cables which may be encountered during the cable attachment operation at step 902.

In a particular embodiment, the step 902 may be performed by a single operator. The single operator may be positioned at, or adjacent to, the storage volume. The single operator may pull the elongated cable back towards the storage volume while coupling the cable to the cable spring at step 902. In certain instances, the operator may twist the cable while coupling the cable to the cable spring so as to remove relative twist between the cable and the cable spring. For instance, when viewing the cables on the cable spring, the outer jackets of the cables can appear untwisted within the receiving areas. In other instances, the cable may be relatively twisted with respect to the cable spring. That is, the operator is not required to actively twist the cable while coupling the cable to the cable spring. By not actively twisting the cable during installation in the cable receiving area, the cable can have a relative twist in the cable receiving area.

In an embodiment, the step 902 of coupling the one or more cables to the cable spring may be performed prior to a slicing operation between at least two of the one or more cables. That is, the loose ends of the one or more cables may be coupled to the cable spring before being coupled together through one or more spliced interfaces. In such a manner, the cables can be coupled to the cable spring with minimal internal stress. That is, while splicing may be performed prior to coupling the cable relative to the cable spring in certain instances, splicing the cables prior to coupling the cables to the cable spring may result in increased internal stress within the cables when coupling the already-spliced cables to the cable spring. More particularly, attaching the cables together at their distal ends (i.e., the ends of the loose ends) prior to installing the cables in the cable receiving areas may incur relative twist between the cables and the receiving areas during installation of the cables in the receiving areas. This may prevent the cables from being easily installed in the cable receiving areas without damaging the cables. In particular, internal stress of the cable may increase during installation of the cables in the final coils of the cable spring as the cables are not able to release relative twist at their distal ends.

After performing step 902, the cable spring and cables can be moved from the retracted, or substantially retracted, position to the extended, or generally extended position at step 902. In the extended position, the cables may reach the cable operation station, e.g., a nearby vehicle having a cable operation station including, e.g., splicing equipment. As an effective length of the cable spring increases, the diameter of the cable spring may decrease. That is, the diameter of at least some of the coils of the cable spring may decrease as the cable spring is extended. The splicing operation may result in one or more splices being formed between the cables. These splices may be housed in an enclosure. In certain instances, the enclosure may share any one or more characteristics with the aforementioned enclosure 112. The enclosure can protect the one or more spliced interfaces formed between the cables. In an embodiment a transition element can be configured to transition the cables from the cable spring to the enclosure. The transition element can include one or more passageways configured to receive one or more of the cables. In an embodiment, the transition element can be integral with one or both of the enclosure or cable spring. In another embodiment, the transition element can be separate from either, or both, of the enclosure or cable spring. In certain instances, the transition element can be relatively rigid. In other instances, the transition element can be relatively flexible. Relative rigidity of the transition element may be determined in view of the rigidity of the cable spring or the cables. The transition element can extend between the cable spring and the enclosure so as to protect the cables within the space therebetween.

As the cable spring and cables are moved towards the extended position, energy can be stored by at least the cable spring. The stored energy can be caused by elastic deformation of the cable spring created during step 904. The stored energy can be configured to bias the cable spring towards the retracted position. In such a manner, the operator can release the cable spring (or cables) after completing a cable operation step (e.g., a splicing operation between at least two of the one or more cables) and easily return the cable spring to the retracted, or substantially retracted position. In an embodiment, the cable spring can be configured to store sufficient energy to at least partially return the cable spring to the retracted position. The operator may provide additional energy to the cable spring so as to move the cable spring from a partially retracted position to the retracted position. In another embodiment, the cable spring can be configured to store sufficient energy to fully return the cable spring to the retracted position. In certain instances, the cable spring 114 may be selectively retainable in the extended position, or a relatively extended position. For example, a locking mechanism may be deployed to allow the operator to selectively maintain the cable spring 114 at a desired length. The locking mechanism may include a braking system configured to control, e.g., retard, retraction speed when the cable is freed to return to the retracted position.

While performing step 904, the cable spring can be configured to maintain a minimum bend radius of the one or more cables. The minimum bend radius may be defined by the particular characteristics of the cable being used. For instance, fiber optic cables include silica-based fibers which typically break when exceeding known minimum bend radii. The cable spring can be configured to prevent exceeding the minimum bend radius of the cable, thus protecting the cable against damage during step 904.

In an embodiment, step 904 can be performed by moving the cable spring towards the storage volume (e.g., handhole) until the cable spring and one or more cables are sufficiently retracted so as to be disposed within the storage volume. The diameter of the cable spring and one or more cables in the retracted, or substantially retracted position, may fit within the storage volume. In an embodiment, the enclosure can be disposed inside a volume corresponding to the generally helical shape of the body of the cable spring. In another embodiment, the enclosure can be disposed between the cable spring and a sidewall of the storage volume. A cover can be used to close the storage volume to prevent unwanted access to the cables or prevent environmental contamination.

During future operations, an operator can again access the cable spring and cables by removing the cover of the storage volume and extending the cable spring from the storage volume.

Further aspects of the invention are provided by one or more of the following embodiments:

Embodiment 1. A cable manager for one or more cables of a telecommunication system, the cable manager comprising: a body configured to be selectively engaged with a loose end of at least one of the one or more cables, wherein the body defines an effective unbiased length, as measured in an unbiased state, and an effective biased length, as measured in a biased state, and wherein the effective biased length is greater than the effective unbiased length.

Embodiment 2. The cable manager of any one or more of the embodiments, wherein the body defines a first receiving area configured to receive a first cable of the one or more cables.

Embodiment 3. The cable manager of any one or more of the embodiments, wherein the body further defines a second receiving area configured to receive a second cable of the one or more cables.

Embodiment 4. The cable manager of any one or more of the embodiments, wherein the body defines a generally helical shape, and wherein the body is configured to maintain a minimum bend radius of the loose end of the one or more cables above a threshold minimum bend radius.

Embodiment 5. The cable manager of any one or more of the embodiments, wherein the cable manager is configured to fit within a storage volume when the cable manager is in the unbiased state.

Embodiment 6. The cable manager of any one or more of the embodiments, wherein the storage volume comprises a handhole, and wherein the effective biased length of the cable manager is sufficient to reach the cable from the handhole to a separate cable operation station.

Embodiment 7. The cable manager of any one or more of the embodiments, wherein the cable manager is configured to absorb energy as the cable manager is moved to the separate cable operation state.

Embodiment 8. The cable manager of any one or more of the embodiments, wherein the body defines a generally helical shape defining an effective unbiased diameter, as measured in the unbiased state, and an effective biased diameter, as measured in the biased state, and wherein the effective unbiased diameter is greater than the effective biased diameter.

Embodiment 9. A telecommunication system comprising: a storage volume; a first cable extending from the storage volume; a second cable extending from the storage volume; and a cable manager comprising a body configured to be selectively engaged with at least one of the first or second cables and form an extension spring for the at least one of the first or second cables.

Embodiment 10. The telecommunication system of any one or more of the embodiments, wherein the body comprises a first receiving area configured to receive the first cable and a second receiving area configured to receive the second cable, and wherein the first and second receiving areas extend in parallel along a length of the cable manager.

Embodiment 11. The telecommunication system of any one or more of the embodiments, wherein the first receiving area is open such that the first cable is at least partially exposed from the cable manager.

Embodiment 12. The telecommunication system of any one or more of the embodiments, wherein the telecommunication system further comprises an enclosure configured to house a plurality of cable splices between the first and second cables, wherein the cable manager is configured to maintain the at least one of the first or second cables in a generally helical shape when the cable manager is in an unbiased state.

Embodiment 13. A method of storing one or more cables in a storage volume of a telecommunication system, wherein the one or more cables are configured to extend from the storage volume to a separate cable operation station spaced apart from the storage volume, the method comprising: coupling the one or more cables to a cable manager; and moving the cable manager between an extended position where the cable manager is in a biased state and a retracted position where the cable manager is in an unbiased state.

Embodiment 14. The method of any one or more of the embodiments, wherein coupling the one or more cables with the cable manager is performed when the cable manager is in the retracted position.

Embodiment 15. The method of any one or more of the embodiments, wherein coupling the one or more cables to the cable manager comprises inserting the one or more cables into receiving areas disposed in a body of the cable manager.

Embodiment 16. The method of any one or more of the embodiments, wherein coupling the one or more cables to the cable manager is performed prior to performing a splicing operation between at least two of the one or more cables.

Embodiment 17. The method of any one or more of the embodiments, wherein moving the cable manager comprises biasing the cable manager to the extended position so the at least two of the one or more cables reaches the cable operation station, and wherein biasing the cable manager to the extended position causes the cable manager to store sufficient energy to at least partially return the cable manager to the retracted position.

Embodiment 18. The method of any one or more of the embodiments, wherein the cable manager is configured to maintain a minimum bend radius of the one or more cables above a threshold minimum bend radius.

Embodiment 19. The method of any one or more of the embodiments, wherein the cable manager comprises a body defining a generally helical shape, and wherein the method further comprises inserting an enclosure inside a volume defined by the generally helical shape when the cable manager is in the retracted position, the enclosure housing a plurality of splices between at least two of the one or more cables.

Embodiment 20. The method of any one or more of the embodiments, further comprising moving the cable manager to the retracted position such that the cable manager and the one or more cables are disposed within the storage volume.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A telecommunication system comprising:
   a cable manager comprising a body configured to be selectively engaged with at least one of a first cable and a second cable and form an extension spring for the at least one of the first or second cables, wherein the cable manager is configured to maintain the at least one of the first or second cables in a generally helical shape when the cable manager is in an unbiased state, wherein the body defines an effective unbiased length, as measured in the unbiased state, and an effective biased length, as measured in the biased state when the body is in the extended position, and wherein the effective biased length is at least 300% the effective unbiased length; and
   an enclosure configured to house a cable splice between the first and second cables.

2. The telecommunication system of claim 1, wherein the enclosure is coupled to the cable manager through an attachment element.

3. The telecommunication system of claim 1, wherein the enclosure comprises a first portion, a second portion, and an intermediary member configured to maintain the first and second portions of the enclosure in a closed state, and wherein the first and second portions of the enclosure define an internal passageway in the enclosure.

4. The telecommunication system of claim 1, wherein the enclosure is disposed within a volume corresponding to the generally helical shape of the body of the cable manager when the cable manager is in the unbiased state.

5. The telecommunication system of claim 1, wherein the body of the cable manager defines a first receiving area configured to receive the first cable and a second receiving area configured to receive the second cable.

6. The telecommunication system of claim 5, wherein the first and second receiving areas are in open communication with one another.

7. The telecommunication system of claim 5, wherein the first and second receiving areas extend from a radially outer side of the cable manager.

8. The telecommunication system of claim 5, wherein at least one of the first and second receiving areas comprises a circular cross-sectional profile.

9. The telecommunication system of claim 1, wherein the enclosure comprises one or more openings to provide passage of at least one of the first or second cables into the enclosure, and wherein at least one guide interface is disposed adjacent to the one or more openings to guide the at least one of the first second cables into the one or more openings.

10. The telecommunication system of claim 1, wherein the cable manager is configured to store energy as the body is moved from a retracted position to an extended position, and wherein stored energy is sufficient to automatically retract the body from the extended position to the retracted position.

11. A telecommunication system comprising:
    a cable manager comprising a generally helical body configured to receive at least one of a first cable and a second cable, wherein the generally helical body defines an effective unbiased diameter, as measured in an unbiased state, that is greater than an effective biased diameter, as measured when the generally helical body is in an extended state; and
    an enclosure configured to house a cable splice between the first and second cables, wherein a majority of the enclosure is configured to be disposed within a volume corresponding to the generally helical shape of the body of the cable manager when the cable manager is in an unbiased state.

12. The telecommunication system of claim 11, wherein the body of the cable manager defines a first receiving area configured to receive the first cable and a second receiving area configured to receive the second cable, and wherein at least one of the first and second receiving areas comprises a circular cross-sectional profile.

13. The telecommunication system of claim 11, wherein the cable manager is configured to store energy as the body is moved from a retracted position to an extended position, and wherein stored energy is sufficient to automatically retract the body from the extended position to the retracted position.

14. The telecommunication system of claim 11, wherein the enclosure is coupled to the cable manager through a zip tie.

15. The telecommunication system of claim 11, wherein the enclosure comprises one or more openings to provide passage of at least one of the first or second cables into the enclosure, and wherein at least one guide interface is disposed adjacent to the one or more openings to guide the at least one of the first second cables into the one or more openings.

16. The telecommunication system of claim 11, wherein the enclosure comprises a first portion, a second portion, and an intermediary member configured to maintain the first and second portions of the enclosure in a closed state, and wherein the first and second portions of the enclosure define an internal passageway in the enclosure.

17. The telecommunication system of claim 11, wherein the body defines an effective unbiased length, as measured in an unbiased state when the body is in a retracted position, and an effective biased length, as measured in the biased state when the body is in the extended position, and wherein the effective biased length is at least 300% the effective unbiased length.

18. The telecommunication system of claim 11, wherein the cable manager is configured to be disposed within a handhole.

19. A telecommunication system comprising:
a cable manager comprising a generally helical body configured to receive at least one of a first cable and a second cable; and
an enclosure configured to house a cable splice between the first and second cables, wherein a majority of the enclosure is configured to be disposed within a volume corresponding to the generally helical shape of the body of the cable manager when the cable manager is in an unbiased state,
wherein the generally helical shape is formed about a centerline, wherein the cable manager includes a plurality of coils extending around the centerline, and wherein the generally helical body is stretchable in a direction along the centerline.

* * * * *